United States Patent [19]

Glover

[11] Patent Number: 5,533,845
[45] Date of Patent: Jul. 9, 1996

[54] MILLING MACHINE

[76] Inventor: John A. Glover, P.O. Box 210187, Dallas, Tex. 75211

[21] Appl. No.: 245,353

[22] Filed: May 17, 1994

[51] Int. Cl.⁶ .............................. B23C 1/20; B23B 45/14
[52] U.S. Cl. ...................... 409/175; 408/72 R; 408/130; 409/178
[58] Field of Search .................... 409/175, 176, 409/177, 143, 132, 178, 131; 408/224, 130, 132, 76, 72 R, 110

[56] References Cited

U.S. PATENT DOCUMENTS

| | | | |
|---|---|---|---|
| 1,775,000 | 9/1930 | Sichel . | |
| 2,619,880 | 12/1952 | Hosea . | |
| 2,823,590 | 2/1958 | Swanson et al. . | |
| 3,501,999 | 3/1970 | Parks | 409/178 X |
| 3,802,316 | 4/1974 | Bohm et al. . | |
| 4,022,106 | 5/1977 | Kile | 409/178 |
| 4,197,908 | 4/1980 | Davis et al. | 409/143 |
| 4,490,529 | 4/1984 | Henslee et al. | 408/130 |
| 4,594,030 | 6/1986 | Weigel, Jr. | 408/130 X |
| 4,689,920 | 9/1987 | Geise | 409/175 X |
| 4,761,104 | 8/1988 | Hillestad . | |
| 4,850,763 | 7/1989 | Jack | 409/178 |
| 4,923,343 | 5/1990 | Silk . | |
| 5,001,818 | 3/1991 | Kromer et al. . | |
| 5,030,046 | 7/1991 | Ricci . | |
| 5,032,051 | 7/1991 | Gilmore . | |
| 5,105,882 | 4/1992 | Ralston et al. | 409/143 X |
| 5,106,243 | 4/1992 | Hunt | 409/178 |
| 5,152,643 | 10/1992 | McGettigan . | |
| 5,197,540 | 3/1993 | Yagi et al. | 408/130 X |
| 5,286,144 | 2/1994 | Griner | 408/224 |
| 5,368,423 | 11/1994 | Hanna | 409/132 |

FOREIGN PATENT DOCUMENTS

| | | | |
|---|---|---|---|
| 5189 | 11/1979 | European Pat. Off. | 409/175 |
| 2552742 | 5/1977 | Germany | 409/175 |
| 3340036 | 5/1985 | Germany | 408/130 |
| 643171 | 5/1984 | Switzerland | 408/130 |
| 683858 | 9/1979 | U.S.S.R. | 408/130 |
| 544875 | 4/1942 | United Kingdom | 408/130 |
| 551514 | 2/1943 | United Kingdom | 409/175 |
| 990196 | 4/1965 | United Kingdom | 408/130 |

*Primary Examiner*—William Briggs
*Attorney, Agent, or Firm*—Sankey & Luck

[57] ABSTRACT

A portable milling apparatus is disclosed where said apparatus, in one embodiment, comprises a cutting head, a control mechanism and a power supply where said cutting head generally includes a frame, an axial displacement means, a rotary cylinder and alignment means.

7 Claims, 6 Drawing Sheets

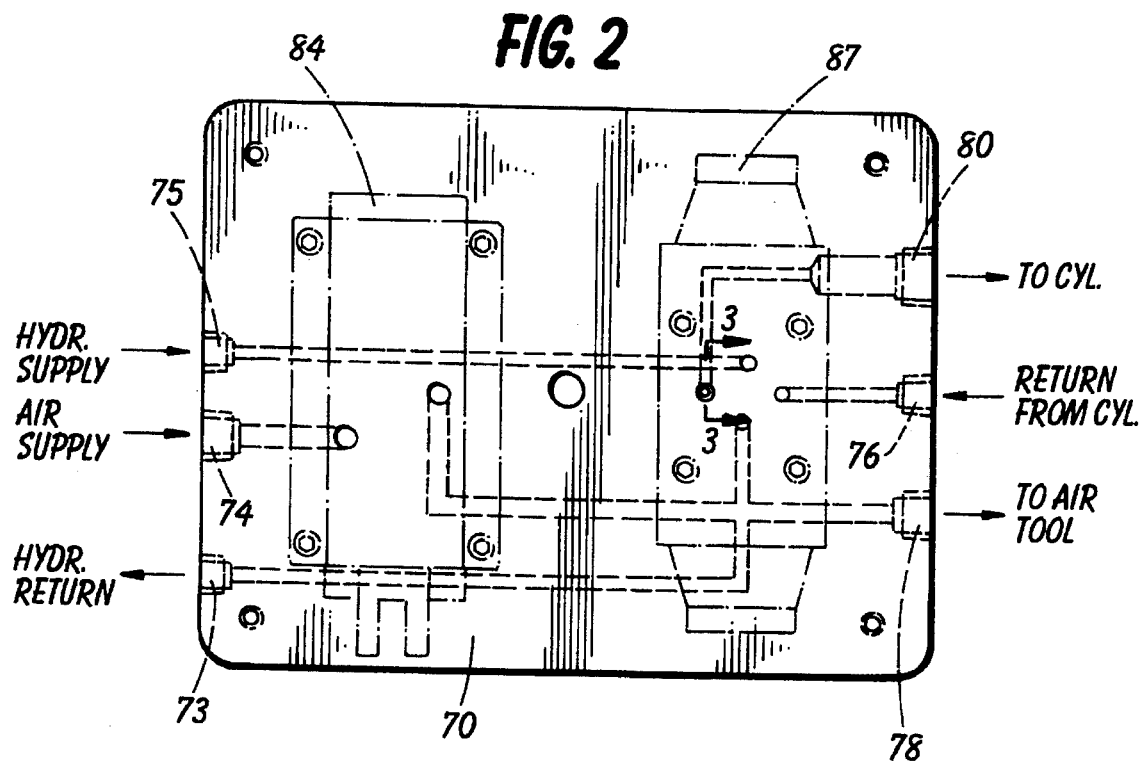
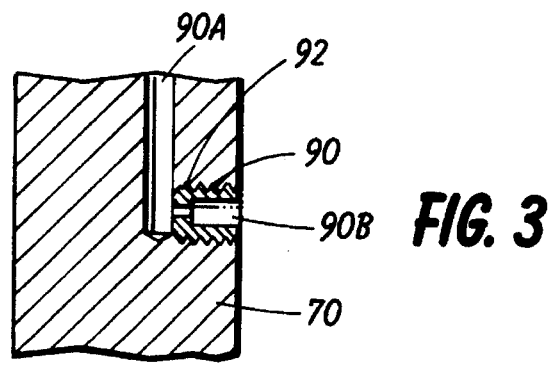
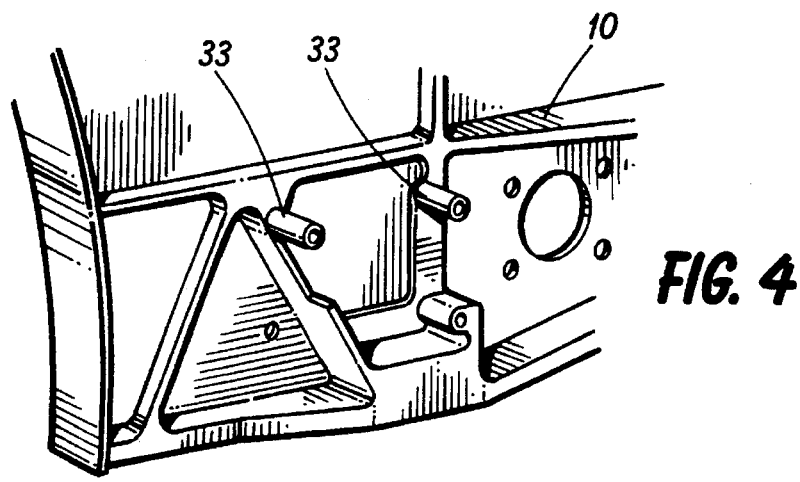

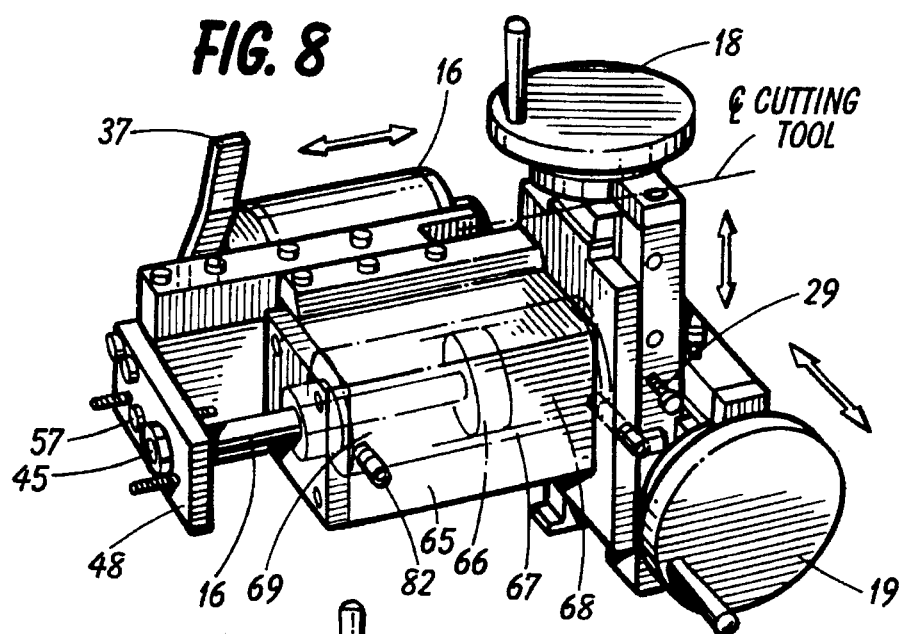
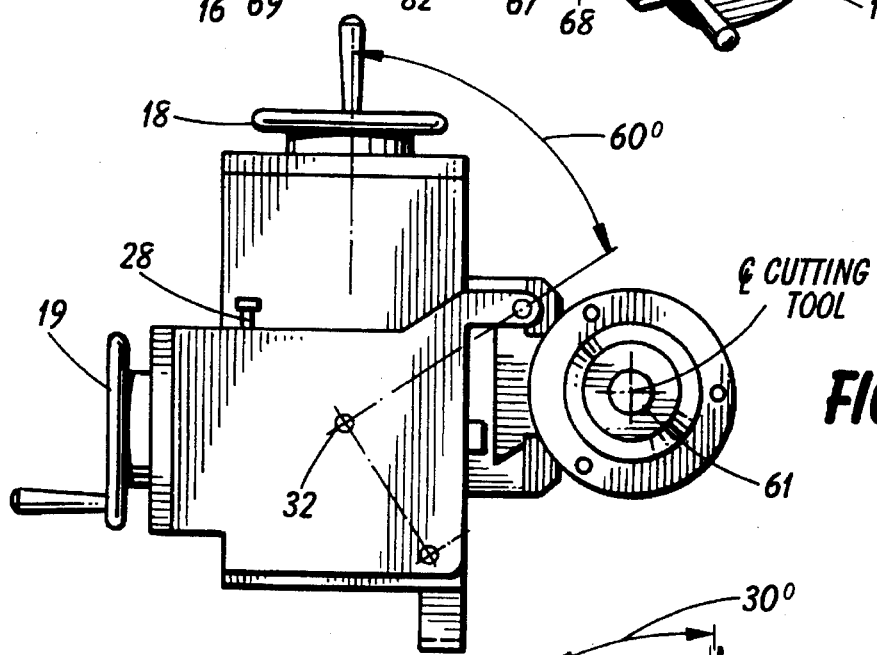
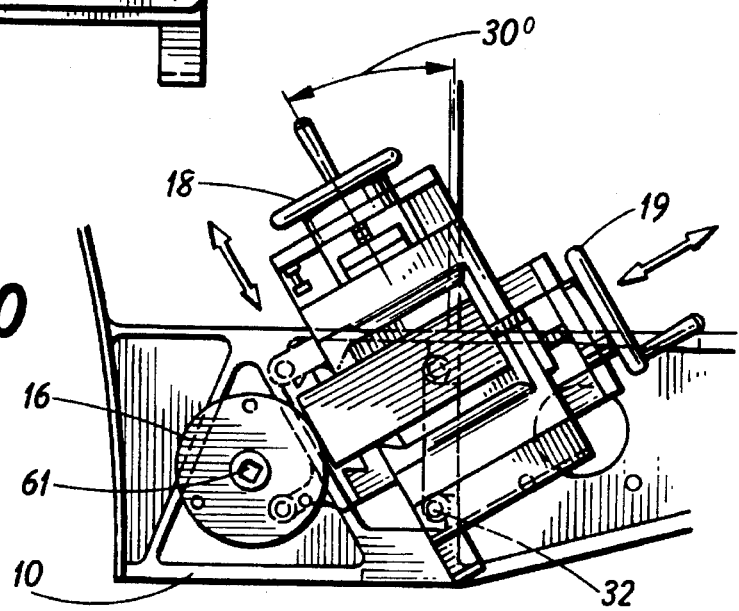

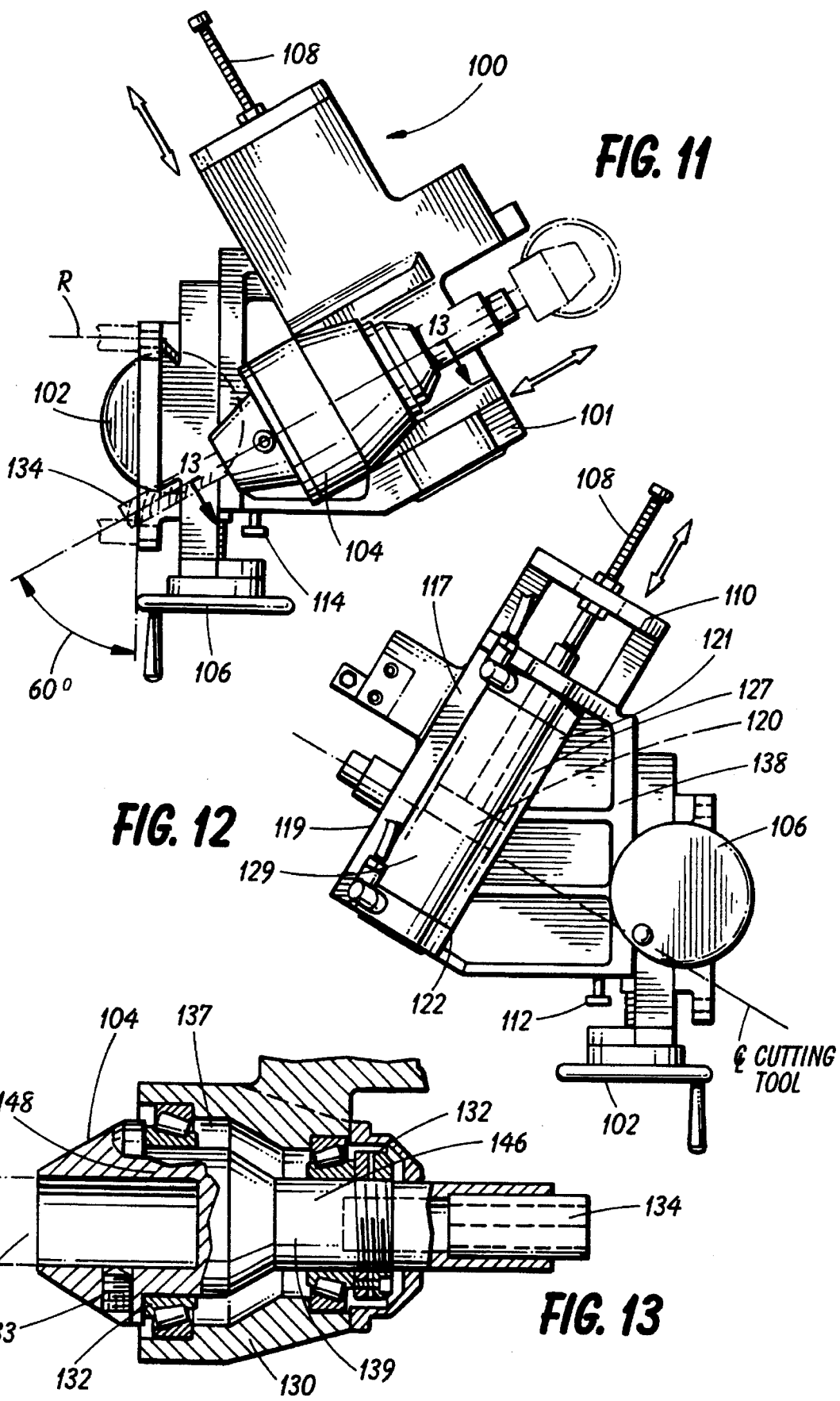

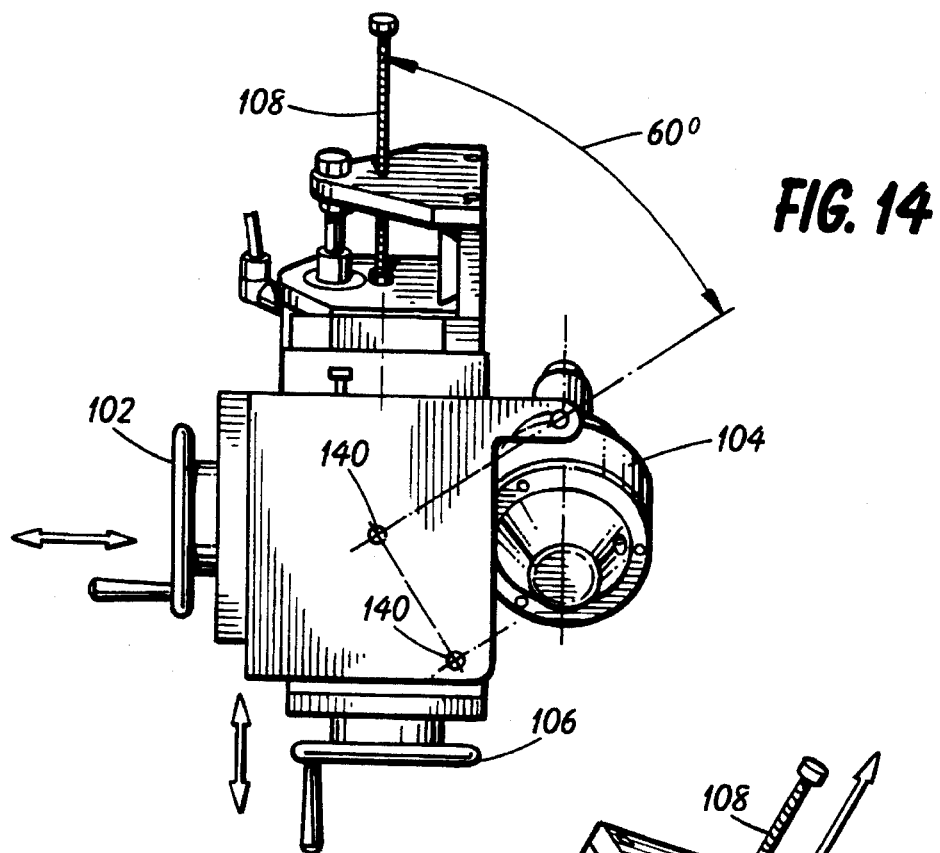
FIG. 14
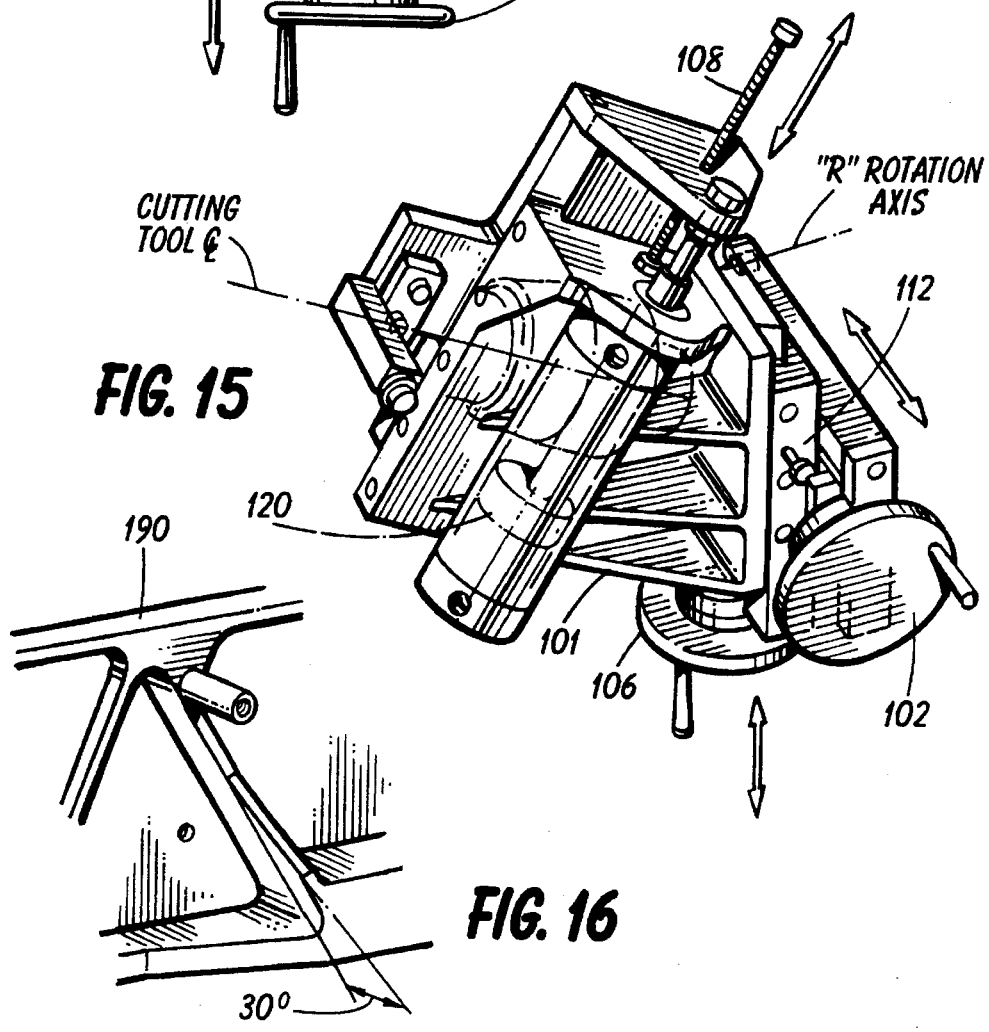
FIG. 15
FIG. 16

MILLING MACHINE

BACKGROUND OF THE INVENTION

1. Field of the Invention

The present invention relates generally to milling machines and methods for their use. More specifically, the present invention relates to a milling apparatus capable of milling a structural, machined component in situ within highly constrained physical operating parameters.

2. Description of the Prior Art

Structural components of modern machinery, especially major transportive craft such as aircraft and marine vehicles, are often prone to fatigue, structural failure and/or replacement. In this connection, one of the major limitations to aircraft service life is structural damage induced by service or stress loads encountered during aircraft use. Likewise, a major limitation on the service life of marine craft is corrosion and fatigue of selected areas of the ship structure. Both marine and aircraft undergo continuous retrofits and upgrades during their service life.

Traditional solutions to fatigue and structural failure have been to selectively repair or replace an affected component. Such repair and/or replacement has heretofore involved the disassembly and removal of the damaged component to a milling or machine shop. Such disassembly and removal, however, often represents an impractical and cost-prohibitive solution when the component forms a part of an air or marine craft which cannot be conveniently disassembled or where removal of the affected part is prohibitive due to weight or space constraints. Such considerations are also significant when retrofits or upgrades are attempted while the craft is still in service.

One solution to the above problems has been the development of portable milling machines which may, in a general sense, be utilized at the job site. Such portable milling machines are disclosed, for example, in U.S. Pat. No. 1,775,000 as issued to Sichel and U.S. Pat. No. 4,761,104 as issued to Hillestad.

Disadvantages associated with these milling machines, however, prevent their application to repair a structural member while it remains in contacting relation to the main body of the apparatus. Instead, portable apparatus such as those disclosed in Sichel and Hillestad merely provide for the milling operation to be performed in proximate relation to the craft itself and do not provide for in situ milling operations. Moreover, the cutting and milling movement employed by these apparatus does not allow their application to a physically restricted environment, such as within an aircraft wing or within the engine compartment of a marine vessel.

SUMMARY OF THE INVENTION

The present invention addresses the above and other disadvantages of prior art milling machines by providing a portable, relatively lightweight apparatus which has the capability to mill a selected structural component in situ within highly restricted physical operating parameters. In such a fashion, the present invention allows for the repair or reworking of a given component generally without disassembly and removal of said component from the surrounding structure.

The present invention generally includes two different cutting and milling embodiments which are operable in association with a portable power and control means. One embodiment of the invention is directed to the formation of a straight or boss cut and generally includes a frame, a rotatable cutting head moveable about the z axis relative to the workpiece, a detachable power means, and means to allow variable and selected orientation of the head about the x and y axis. In a preferred embodiment, the detachable motor is operable off the moderately low pressure air supplies ordinarily available on or about an aircraft flight line or onboard ship.

The second embodiment of the invention is directed to the formation of an angle cut and generally includes a frame, a rotatable cutting head slidably disposed in the frame, a detachable power means for the cutting head and variable orientation means to orient the cutting head about the x and y axis.

The above-described embodiments are operable via a portable power cart which includes, inter alia, means to impart an axial force between the cutting head and the workpiece, monitoring and control means.

The present invention offers a number of advantages over the art. One such advantage is the production of a milling apparatus and support assembly operable via conveniently available pressurized air supplies. In such a fashion, the milling apparatus does not require special or dedicated power supplies, thereby enhancing its portability.

Another advantage of the present invention is its ability to perform highly selective milling operations in situ. Accordingly, the present invention affords significant time savings and enables repairs or replacements to be undertaken without the need for extensive disassembly.

Still further advantages are seen in the ability of the present invention to perform milling operations in highly confined environments, e.g., within an airplane wing, thereby resulting in savings in terms of time and cost which would have to be undertaken in disassembly of the component.

Other benefits and advantages of the present invention may be seen by reference to the following drawings and detailed description.

BRIEF DESCRIPTION OF THE DRAWINGS

FIG. 2 is a detail view of the control mechanism of the present invention as identified in FIG. 1.

FIG. 3 is a cross section detail view of the hydraulic reduction port of the control mechanism as taken along lines 3—3 in FIG. 2.

FIG. 4 is a perspective view of one application of the present invention as contemplated for use in milling a selected area within an airplane wing.

FIG. 8 is a perspective view of the embodiment as illustrated in FIG. 1.

FIG. 9 is a bottom view of the embodiment illustrated in FIG. 8.

FIG. 10 is a bottom schematic view of the embodiment illustrated in FIG. 9 vis-a-visa given workpiece.

FIG. 11 is a top view of a second embodiment of an angled cutting head.

FIG. 12 is a side view of the embodiment illustrated in FIG. 11.

FIG. 13 is a cross section of the embodiment illustrated in FIG. 11 as taken along lines 13—13.

FIG. 14 is a bottom view of the embodiment illustrated in FIG. 11.

FIG. 15 is a perspective view of the embodiment illustrated in FIG. 11.

FIG. 16 is a perspective view of a typical workpiece in which a chamfer has been cut by a second embodiment of the invention.

DETAILED DESCRIPTION OF THE PREFERRED EMBODIMENT

The various embodiments of the instant inventions may be seen by reference to FIGS. 1–16, in which FIGS. 1–10 illustrate a straight or boss cutting head and FIGS. 11–16 illustrate an angle cutting head.

Figure 1:
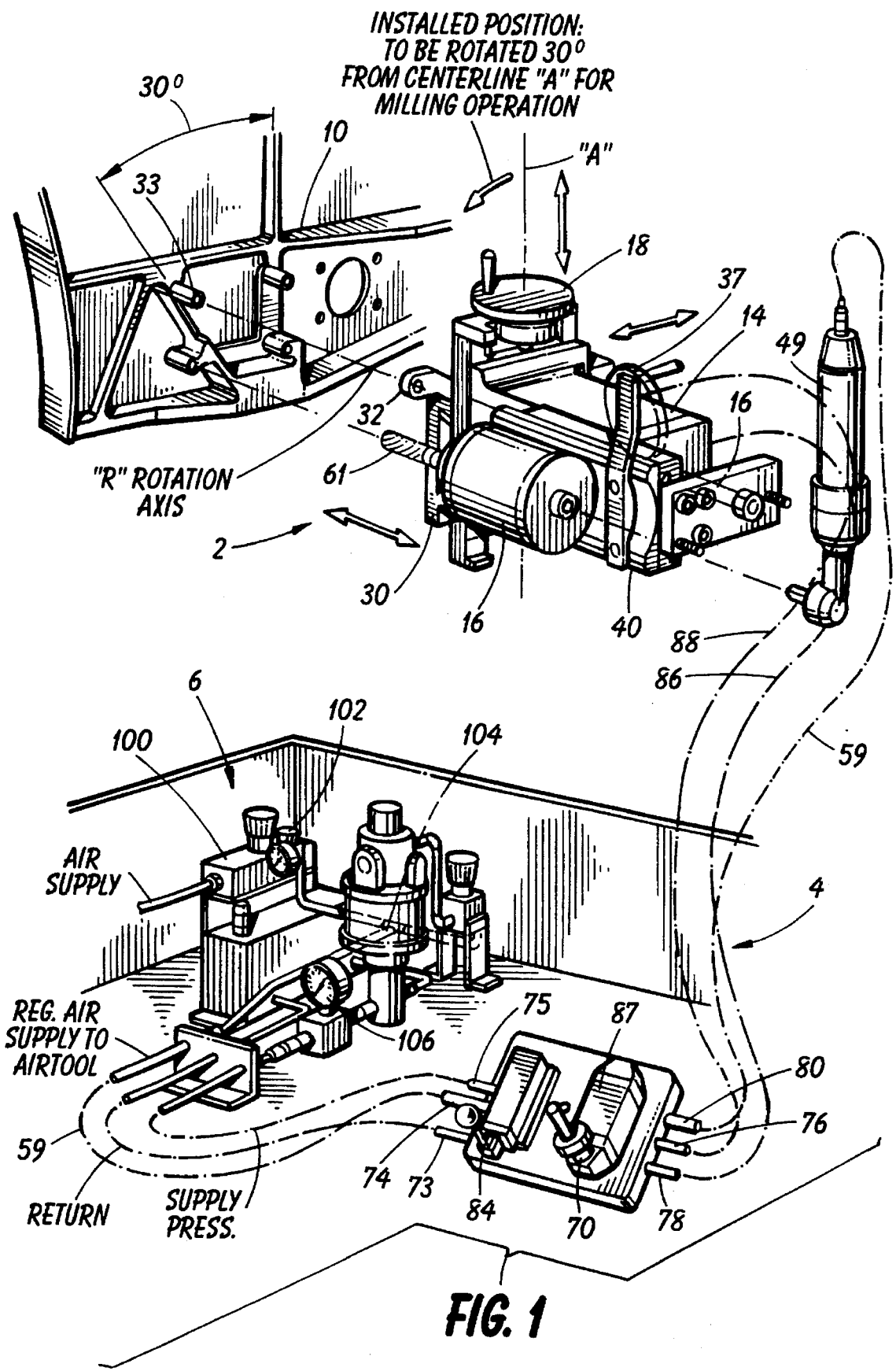
FIG. 1 is a perspective view of one embodiment of the cutting assembly of the present invention including a control mechanism and a power supply.
Figure 5:
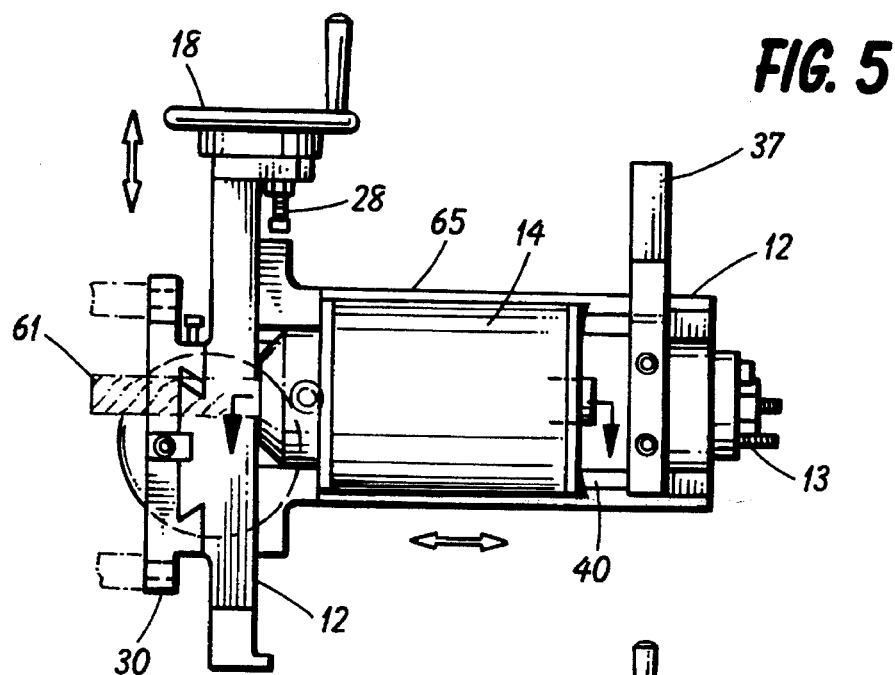
FIG. 5 is a side view of the cutting head of one embodiment of the present invention.
Figure 6:
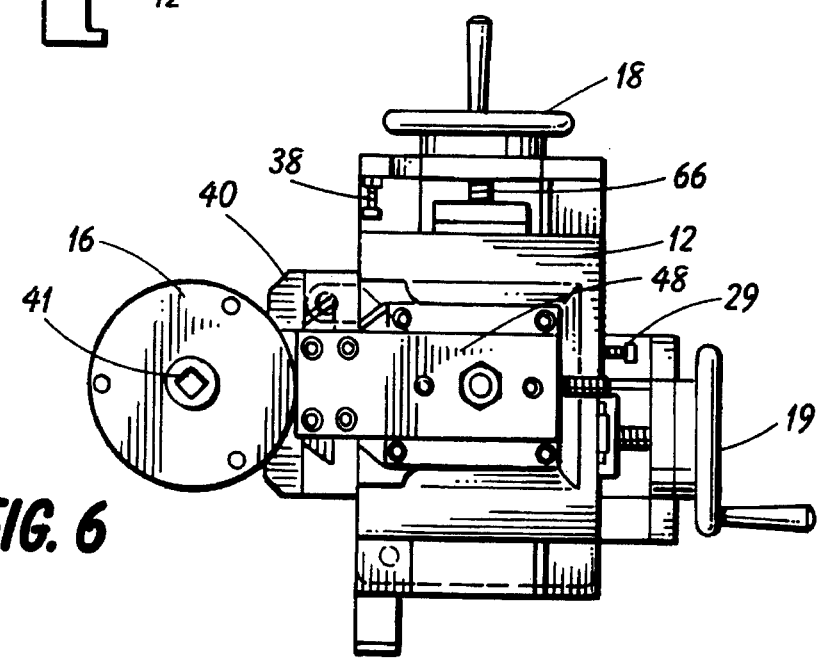
FIG. 6 is a top view of the embodiment illustrated in FIG. 5.

FIG. 1 illustrates a perspective view of one embodiment of the present invention including a cutting head 2, a control mechanism 4 and a portable power supply 6. The boss cutting head 2 illustrated in FIG. 1 is adapted for milling a vertical section from a selected workpiece, e.g. an aircraft wing 10, as will be further described below.

By reference to FIGS. 1 and 5–10, cutting head 2 generally includes a T-shaped frame 12, an axial displacement means 14, a rotary cylinder 16, and alignment means 18 and 19. Frame 12 includes an attachment subassembly 30 which includes one or more attachment sites 32 through which subassembly 30 may be secured to corresponding attachment sites 33 on workpiece 10 via conventional fasteners. By reference to FIGS. 1, 4 and 9–10, it is contemplated that these attachment sites 32 will be customized for each particular application and workpiece. For example, in the instance where the workpiece 10 is already provided with a particular bolt pattern, the attachment sites 32 defined in subassembly 30 will preferably conform to the bolt pattern of the workpiece.

To enable milling of selected locations on the workpiece 10, frame 12 is moveable relative to subframe 30 about the x and y axis via a rack and pinion type assembly. In the embodiment illustrated in FIGS. 1–10, movement along the x and y axis is manually accomplished by alignment wheels 18 and 19 which, when turned in either a clockwise or counterclockwise direction, move frame 12 over subassembly 30 a selected amount. In such a fashion, any point in a grid defined by physical stops 29 and 28 may be selected for milling. Stops 29 and 28 may be bolts or other similar threaded element threadly engageable with frame 12 so as to allow for selective adjustment. It is also envisioned that movement between frame 12 and subframe 30 may be accomplished automatically, e.g. via a via a conventional pneumatic or hydraulic movement mechanism manipulated by hand or computer control.

Figure 7:
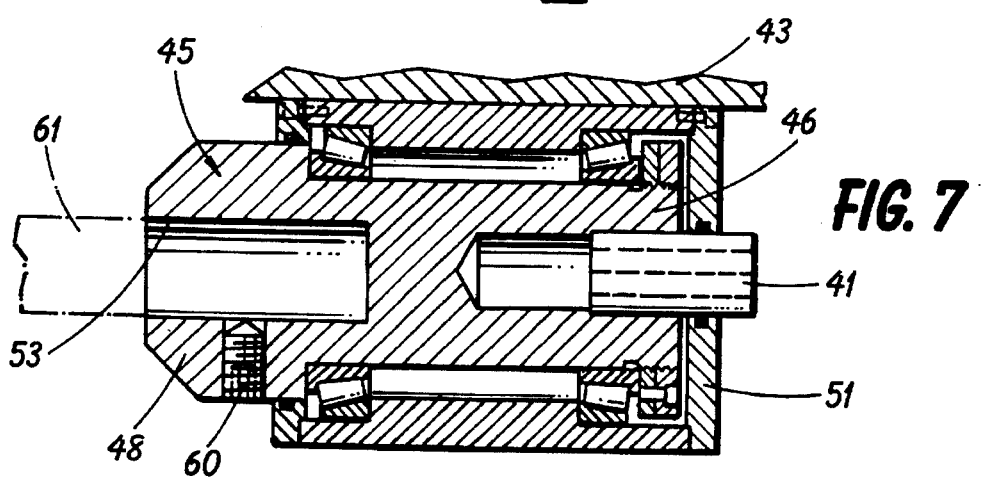
FIG. 7 is a cross section of the embodiment illustrated in FIG. 5 as taken along lines 7—7 in FIG. 5.

Referring to FIGS. 1 and 5–10, cutting head 2 includes a rotary cylinder 16 which is movably coupled to frame 12 via a slide 40 which enables movement of cylinder 16 relative to the workpiece 10 along the z axis. Slide 40 is in turn fixedly coupled to bracket 48 in a manner described below. Referring to FIG. 7, cylinder 16 itself comprises a cylindrical housing 43 in which is disposed a cutting tool assembly 45 supported and rotatable within housing 43 by a set of bearings, e.g. taper roller bearings. To prevent the introduction of foreign matter and/or contaminants during the milling operation, housing 43 also preferably includes a cover plate 51 secured thereto in a conventional fashion. Cutting tool assembly 45 defines an upper end 46 and a lower end 48. Upper end 46 is preferably provided with a removable connector, e.g. a rosette screw 41, to enable connection between said assembly 45 and a power means 49 as will be further described below. In such a fashion, assembly 45 may be rotated within housing 43. The lower end 48 of assembly 45 defines an adjustable tool chuck 53 which accommodates a conventional cutting or milling bit 61 securable therein via adjustment screw 60. It is envisioned that bit 61 may adopt a variety of configurations and be manufactured from a variety of materials depending on the nature of the workpiece 10.

As indicated, assembly 45 is rotatable by a power means 49 which may comprise a conventional air ratchet or the like adapted to engage connector 41. It has been found that a modified Gardner-Denver air ratchet sold under the trademark "Nut Runner" is workable in this capacity. In the illustrated embodiment, frame 12 is provided with a bracket 37 adapted to prevent the relative rotation of power means 12 when power means has been actuated. In a preferred embodiment, power means 49 is operable via pressurized fluid e.g. pressurized air, supplied from power supply 6 through control means 4 via flow conduit 59. In order to enable bit travel in the order of two inches per minute, air pressure in the range of 300 lbs. per square foot is desirable. This pressurized air supply may be produced by a conventional air compressor or may alternatively be derived from compressed air sources found on the work site.

Referring to FIG. 8, axial displacement means 14 comprises a housing 65 fixedly coupled to or integral with frame 12 and defining therein a bore 67 receivable to a piston 66. Piston 66 is selectively reciprocal between a first and second position by the introduction of a pressurized fluid, e.g. hydraulic fluid, in chambers 68 or 69 defined below and above piston 66 as illustrated in FIG. 8. Such fluid is introduced or extracted from chambers 68 and 69 via inlets 82 and 83 which are coupled to supply lines 86 and 88 which are in turn coupled to power means 6 via control mechanism 4 as will be further described below. Accordingly, the axial position of piston 66 may be modulated by the operator. Piston 66 is fixedly coupled to slide 48 via bracket 43 and fastener 45. In such a fashion, the axial movement of piston 66 enables the axial movement of rotary cylinder 16 and hence tool 61 relative to workpiece 10 along the z axis via control system 4. This vertical movement of rotary cylinder 16 relative to frame 12 is governed by the use of an automatic or manual stop 57 as illustrated.

The control mechanism 4 of the present invention may be seen by reference to FIGS. 1–3. As illustrated in FIG. 1, control mechanism 4 generally includes a housing 70 provided with a pneumatic and hydraulic inlets, 73 and 75, a first hydraulic return 74, a second hydraulic return 76, and pneumatic and hydraulic outlets, 78 and 80, respectively. Control mechanism 4 is provided with a pneumatic control 84 to regulate the flow of pressurized air to power means 49 and thus modulate the rotational speed of bit 61. Mechanism 4 is also provided with a hydraulic control 87 to modulate hydraulic flow and pressure to chambers 68 and 69 and thus control the axial position of bit 61 relative to workpiece 10.

Housing 70 is preferably formed from a solid, metallic block through which is disposed a number of fluid passageways to accommodate the flow of pressurized fluids to power means 49 and axial displacement means 14. With respect to the flow of hydraulic fluid, it is desirable to enable a significant axial pressure between bit 61 and workpiece 10 while minimizing the requirement for the generation of large hydraulic pressures by power supply 6. This is accomplished by creation of a significant pressure differential between the hydraulic input and output occurring through control mechanism 4. Referring to FIGS. 2 and 3, housing 70 defines a flow restrictor 90 which generally comprises a flow restriction or neck 92 disposed between two fluid passageways 90A and 90B of greater relative diameter. In a preferred embodiment, this neck or restriction has a diameter of some 0.01 inches, although restrictions of other relative diameters are also contemplated within the spirit of the invention.

In a preferred embodiment, power supply 6 comprises means to supply, filter and monitor the pneumatic and hydraulic fluid supplied to cutting head 2. In the embodiment illustrated in FIG. 1, power supply 6 includes an air filter 100, a pressure gauge 102, a hydraulic reservoir 104, a hydraulic pump (not shown) and a hydraulic monitoring means 106. In the spirit of the present invention, the above identified supply, filtering and monitoring means may be assimilated together on a mobile vehicle or cart to enhance its portability.

A second embodiment of the present invention may be seen by reference to FIGS. 11–16 in which is illustrated a cutting tool 100 operable in conjunction with the monitoring and power means as earlier described. This embodiment is adapted to produce and angle cut in a given workpiece such as the chamfer illustrated in FIG. 16. Cutting tool 100 comprises a frame 101, an axial displacement means 119, a rotary cylinder 104 and alignment means 102 and 106.

Frame 101 defines a subframe 107 which is attachable to a given workpiece via a plurality of attachment sites 140 which, a similar fashion to the first mentioned embodiment, are configured to correspond to available bolt pattern sites on a given workpiece 190. Frame 101 is laterally moveable relative to subframe 109 in a manner which will be later described to allow for positioning about the x and y axis.

Axial displacement means 119 is fixedly attached to or integral with frame 101 and comprises a housing 117 defining a cylindrical bore 121 therein, where said bore 21 accommodates a piston 120 reciprocal between a first and a second position so as to define compression chambers 127 and 129 which are situated in flow communication with a source of hydraulic fluid as directed through control mechanism 4. In such a fashion, piston 120 may be reciprocated between a first and second position upon the pressurization of upper 127 or lower 129 chamber as earlier described. It is therefore desirable that piston 120 describe a close fit in bore 121 which may be accomplished via conventional sealing elements e.g. O rings. Piston 120 describes an elongate terminal member 108 which extends beyond cylinder 119 and is coupled to a lateral bracket 110 in the manner illustrated in FIG. 12. Bracket 110 is in turn coupled to slide 138 to which rotary cylinder 104 is rigidly coupled. In such a fashion, the relative vertical position of cylinder 104 relative to workpiece 190 and the cutting bit 150 may be regulated by modulating the flow of hydraulic fluid to axial displacement means 119.

As previously noted, rotary cylinder 104 comprises a housing 130 which is fixedly coupled to slide 138. Housing 130 defines an internal bore 137 which accommodates a tool assembly 132 supported on bearings 132 so as to allow for relative axial rotation. As illustrated, tool assembly 139 defines an upper end 146 and lower end 148. Upper end 146 is adapted to receive a removable connector 134 e.g. a rosette screw, to translate the axial rotation of the power means to cutting tool 150. Lower end 148 defines a tool chuck which accommodates cutting tool 150 via screw 133.

As identified above in relation to the first embodiment, frame 101 may be adjusted relative to subframe 107 via adjustment means 102 and 106. In the embodiment illustrated in FIGS. 11–16, adjustment means 102 and 106 comprises manual adjustment wheels which enable relative movement of the frame 101 and subframe 107 via a rack and pinion arrangement. As noted above, however, automatic adjustment means are also envisioned within the spirit of the invention.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A portable milling tool comprising:
 a frame defining a subframe, where said subframe is attachable to a given workpiece;
 a cutting head assembly movably disposed with respect to said workpiece about an x and y axis, whew said assembly includes a housing and a rotatable cutting head and an external drive receptacle;
 means to move said curing head assembly along a z axis between a first position above said workpiece to a second position in
 contacting relation with said workpiece, including means to induce a selected pressure therebetween, where said means comprises a piston slidably and sealingly disposed within a bore defined in said housing and reciprocal between said first and second positions where said piston is coupled to said cutting head;
 detachable power means engageable with said external drive and operable to induce rotation of said cutting head, where said power means is operable off of a low pressure air supply;
 means to orient said cutting head assembly about said x and y axis; arid
 a control mechanism comprising a housing defining a first and a second passageway divided by a restriction barrier, where said first fluid passageway is coupled in fluid communication to said pressurization means and said second fluid passageway is coupled in fluid communication to said bore.

2. The milling tool of claim 1 where said restriction barrier has a diameter of 0.01 inches.

3. The milling tool of claim 1 wherein said means to rotate said cutting head is actuated by air pressure in the range of 0–300 psi.

4. A milling tool comprising:
 a frame, including means to attach said frame relative to a workpiece, where further said frame includes a housing defining an axial bore therethrough;
 a cutting head including an external drive receptacle;
 a piston slidably disposed in said bore wherein said piston is sealed within said bore so as to define at least one pressurizable chamber, wherein said piston is operatively coupled to said curing head so as to allow for reciprocation of said curing head between a first and a second position along the z axis relative to said workpiece;

means to selectively introduce and extract a volume of fluid into said chamber so as to move said curing head from said first position to said second position, where said means comprises a source or pressurized fluid and a housing having an input and an output port, where said input port is coupled to said source of pressurized fluid and said output port is coupled to said pressurized chamber, where said input and output ports are separated by a flow restriction; and detachable power means engageble with said external drive to induce rotation of said curing head at a selected speed; and means to orient said cutting head along an x and y axis relative to the workpiece.

5. The milling tool of claim 4 wherein said means to induce rotation in said cutting head is operable via a pressurized air source.

6. The milling tool of claim 5 wherein said flow restriction has a diameter of 1/100 of an inch.

7. A portable milling apparatus for milling a given component in situ without the removal of said component from other components to which it is attached, comprising:

a base support member integral to and carrying the milling apparatus;

mounting means associated with said base support for fixing said base support in relation to a given workpiece;

a housing integral to and supported by said base support member where said housing defines an axial bore therethrough;

a cylinder slidably and routably disposed in said bore, where said cylinder is provided with sealing means to define at least one pressurizable chamber;

a cutting head movably coupled to said cylinder, where said cutting head includes an external drive receptacle;

detachable power means engageable with said external drive to induce rotation in said cutting head;

means to selectively introduce a pressurized fluid in the chamber(s) formed in said housing to urge said cylinder to reciprocate between a first and a second position with respect to said component, where said means comprises a housing defining an input and an output portal, where said input portal is coupled to a source of pressurized fluid and where said output portal is coupled to said chamber in said housing, where further said input and output portals are separated by a flow restriction; and means for adjusting the relative orientation of said cutting head relative to said component about the x and y axis.

* * * * *